United States Patent [19]

Kawasaki

[11] Patent Number: 4,868,691
[45] Date of Patent: Sep. 19, 1989

[54] RECORDING OR REPRODUCING APPARATUS

[75] Inventor: Somei Kawasaki, Tokyo, Japan

[73] Assignee: Canon Kabushiki Kaisha, Tokyo, Japan

[21] Appl. No.: 282,871

[22] Filed: Dec. 9, 1988

Related U.S. Application Data

[63] Continuation of Ser. No. 892,584, Aug. 1, 1986, abandoned.

[30] Foreign Application Priority Data

Aug. 2, 1985 [JP] Japan .................................. 60-169675
Aug. 2, 1985 [JP] Japan .................................. 60-170822

[51] Int. Cl.$^4$ .......................... G11B 5/02; G11B 15/12
[52] U.S. Cl. .......................................... 360/68; 360/62
[58] Field of Search ..................................... 360/68, 62

[56] References Cited

U.S. PATENT DOCUMENTS

4,665,446 5/1987 Takayama .............................. 360/62

Primary Examiner—Vincent P. Canney
Attorney, Agent, or Firm—Robin, Blecker & Daley

[57] ABSTRACT

An apparatus for recording or reproducing information on or from a magnetic recording medium by means of a magnetic head, including means for effecting change-over of recording mode and reproducing mode, which is provided with a circuit for preventing variation of DC potential near a change-over point at the time of the change-over to prevent damage of information previously recorded on the recording medium by transient current flowing through the magnetic head and a DC setting capacitor connected in series with said head at the time of said change-over or a circuit for producing said change-over after electric charge stored in a DC component cutting capacitor has been discharged.

17 Claims, 5 Drawing Sheets

RECORDING OR REPRODUCING APPARATUS

This application is a continuation of application Ser. No. 892,584, filed 8/1/86 abandoned.

BACKGROUND OF THE INVENTION

1. Field of the Invention

The present invention relates to a magnetic recording or reproducing apparatus which employs a magnetic sheet or a magnetic tape, etc. as a recording medium and makes a recording or reproduction by using a magnetic head.

2. Description of the Prior Art

Figure 1:
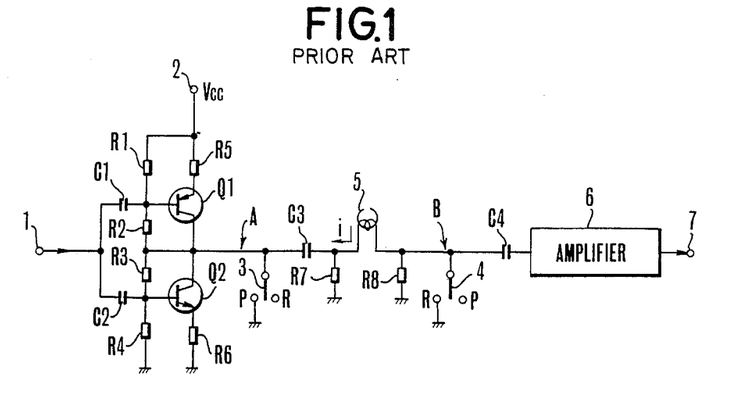
FIG. 1 is a circuit diagram of a circuit for effecting recording mode and reproducing mode of a magnetic head in a conventional recording or reproducing apparatus.

FIG. 1 is a circuit diagram of a recording-reproduction change over circuit for a magnetic head in a conventional magnetic recording or reproducing apparatus, wherein 1 is an input terminal into which a recording signal is fed, and 2 is a DC power source terminal made to have DC potential Vcc and to be connected to a power source only when a recording is made. 3 is a switch to render the impedance between a point A and the ground to "0" only when a reproduction is made and 4 is a switch to render the impedance between a point B and the ground to "0" only when a recording is made. 5 is a magnetic head, 6 is an amplifier for reproduction to amplify a reproducing signal from the magnetic head, and 7 is an output terminal, wherein an amplified reproducing signal is delivered at this output terminal 7 and then is fed into a reproduction processing circuit. Q1, Q2 are transistors, C1, C2, C3, C4 are capacitors, and R1, R2, R3, R4, R5, R6, R7, R8 are resistors, wherein R7 is a resistor for setting a frequency characteristic of the recording signal, and R8 is a resistor for setting a frequency characteristic of the reproducing signal. The resistors R7, R8 are not indispensable and either one of them suffice. And it is an ordinary practice for reducing a distortion in the recording current to provide the relationship of the resistance values to be R1=R4, R2=R3, R5=R6.

The switches 3, 4 are ordinarily made of transistors and are to render the impedance between, respectively, the point A, point B and the ground to virtually "0".

A conventional recording-reproduction change over circuit has the above-mentioned arrangement, and the recording signal fed into the input terminal 1, when a recording is made, is amplified by the transistors Q1, Q2 with an amplification factor of $2 \times L_H/R5$, an then is delivered at the point A. Since the impedance at the point B is "0" when a recording is made, if the level of the recording signal is expressed by $V_R$, a recording current of $V_R \times (2/R5)$ will flow to the magnetic head 5 and will be recorded on the magnetic medium. Here, $L_H$ is an inductance of the magnetic head 5.

Next, when a reproduction is made, the impedance at the point "A" is "0" by the switch 3. The signal recorded on the magnetic recording medium will be reproduced by the magnetic head 5 and will be amplified by the amplifier 6 for reproduction. The amplified signal will be delivered at the output terminal 7 and will be fed to a reproduction processing circuit.

Now, the charging of the capacitor C3 is made in such manner that the DC potential at the point A when a recording is made will be Vcc/2 and the potential difference between the both ends of the capacitor C3 for eliminating the direct current component of the recording signal will be Vcc/2.

If a recording mode is changed over to a reproduction mode under this state the potential at the point A becomes "0" potential, and discharging current of the capacitor C3 flows to the magnetic head 5 as shown in FIG. 1. This signal will be recorded on the magnetic recording medium and the information previously recorded on the magnetic recording medium will be damaged thereby while this discharging current is flowing to the magnetic head 5.

SUMMARY OF THE INVENTION

It is a first object of the present invention to eliminate the above-mentioned drawback in the prior art.

It is a second object of the present invention to provide a recording or reproducing apparatus including a head which can be used for the recording purpose as well as the reproducing purpose in which no inconvenience arises when a change-over is made between a recording mode and a reproducing mode.

It is a further object of the present invention to avoid the above-mentioned drawback by a simple construction.

To attain such objects, in accordance with the present invention there is provided a recording or reproducing apparatus in which no variation of DC potential near a change-over point occurs at the time of change-over of the recording mode and the reproducing mode of the magnetic head.

Further in accordance with the present invention there is provided a recording or reproducing apparatus in which the change-over of the recording mode and the reproducing mode of the magnetic head is effected after the electric charge stored in the DC component cutting capacitor has been discharged.

The other objects and the other features of the present invention will be understood from the explanation concerning the embodiments of the present invention which will be made with reference to the accompanying drawings.

DETAILED DESCRIPTION OF THE PREFERRED EMBODIMENTS

Figure 2:
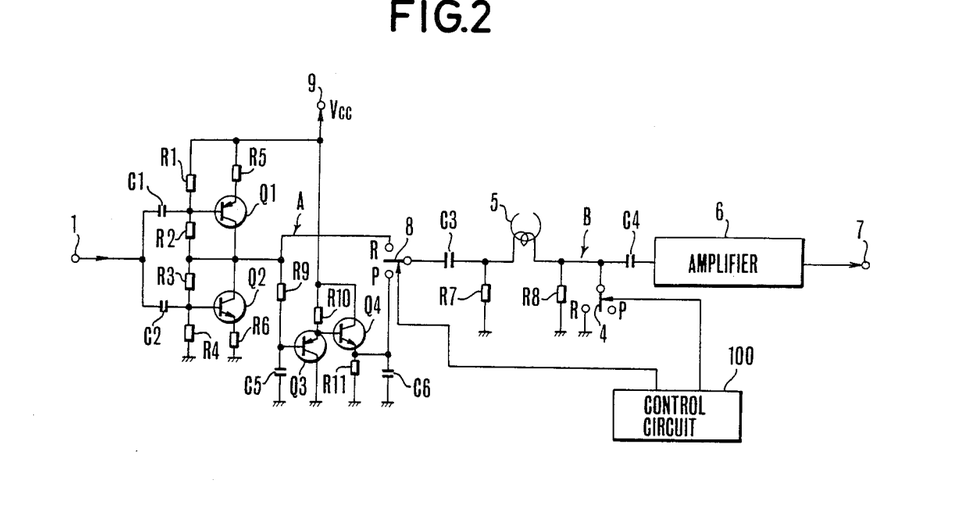
FIG. 2 is a circuit diagram showing a first embodiment of the present invention.

FIG. 2 is a circuit to show an embodiment of the present invention, wherein Q3, Q4 are transistors, C5, C6 are capacitors, and R9, R10, R11 are resistors. Other components having the same identification marks and numbers as those of FIG. 1 are of the same kind. 9 is a terminal to which the potential of Vcc is always supplied from a DC power source, and 8 is a change-over switch for recording and reproducing modes. 100 is a control circuit to drive the switch 8.

In a recording and reproducing change-over circuit of a magnetic recording or reproducing apparatus arranged as mentioned above, the change-over switch 8 is turned to "R" side when a recording is made and thereafter it works in a manner as explained in a conventional case, thus the recording information fed from the input terminal 1 will be recorded by the magnetic head 5.

Also the DC potential at the point A is Vcc/2 also when a recording is made, and the base potential of the transistor Q3 is virtually fixed to the DC potential of Vcc/2 by a time constant R9×C5 which is sufficiently longer than a cycle of the recording signal.

Also, the emitter potential of the transistor Q4 also becomes to have a value of the DC potential of Vcc/2, and the Vcc/2 is charged at the capacitor C6. And the impedance of the circuit including the transistors Q3, Q4 has a value by far smaller than that of the impedance of the magnetic head 5, and when the change over switch 8 is turned to "P" side, the reproducing signal is amplified by the amplifier 6 for reproduction and is outputted at the output terminal 7 and then is inputted into the reproduction processing circuit. Thus, impedances at a time of a recording and at a time of a reproduction are changed over as mentioned above.

Also, while the change-over switch 8 is changed from the "R" side to "P" side at this time, the potential difference between the both ends of the capacitor C3 will not be changed, therefore, no current at all will flow to the magnetic head 5 thereby.

Concerning a kind of an amplifier for recording consisting of the transistors Q1, Q2, it is not necessarily limited to the type mentioned above as long as there are no problems in an electro-magnetic change-over at the magnetic head 5 and the magnetic recording medium.

Figure 3:
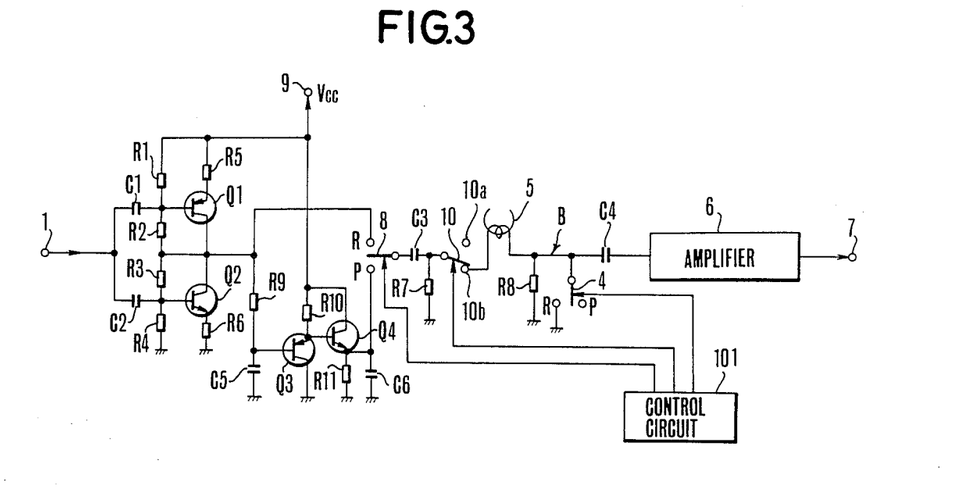
FIG. 3 is a circuit diagram showing a second embodiment of the present invention.
Figure 4:
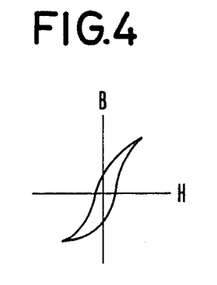
FIG. 4 shows a B-H curve of a magnetic head.

FIG. 3 shows another embodiment which has a same arrangement as that of FIG. 2 except that a change-over switch 10 is added, and the same numbers and marks represent the same components. In this arrangement, however, a resistor R7 has to be provided, and a control circuit 101 controls the switches 4, 8, 10. In the embodiment of FIG. 2, when the potential of the amplifier 6 changes from "0" potential to Vcc potential as well as from Vcc potential to "0" potential at the time when power supply to the apparatus is started or terminated, there will be a case where the potential difference between the both ends of the capacitors C3, C4 changes and charging or discharging current of a pulse shape flows to the magnetic head 5. If the magnetic head 5 is in contact with the magnetic recording medium at this time, the information which has been recorded may be damaged. Further, even if the magnetic head is not in contact with the magnetic recording medium, a flow of the above-mentioned pulse shape current to the magnetic head, when the magnetic head has hysteresis characteristics of such B-H curve as shown in FIG. 4, may magnetize this magnetic head and thus there is a possibility of deteriorating the electro-magnetic properties of the magnetic head.

In such case, if the change-over switch 10 of the FIG. 3 is turned to the 10a side during a period of time when the DC potential at the point A is undergoing a change, the charging or discharging current of the capacitor C3, C4 will not flow to the magnetic head 5, therefore there will be no possibility of deteriorating the electro-magnetic properties.

As has been explained in this embodiment, means for preventing a change in potential near a change-over contact is provided in a recording-reproduction change-over circuit for a magnetic head in a magnetic recording and reproducing apparatus, so that there will be an effect of not damaging the information which has been recorded.

Also in the embodiment shown in FIG. 3, means is provided for separating the magnetic head from the recording-reproduction change-over circuit at the time when the power supply state to the change-over circuit is changed over and, therefore, there is an effect of being able to prevent the magnetization of the magnetic head.

Figure 5:
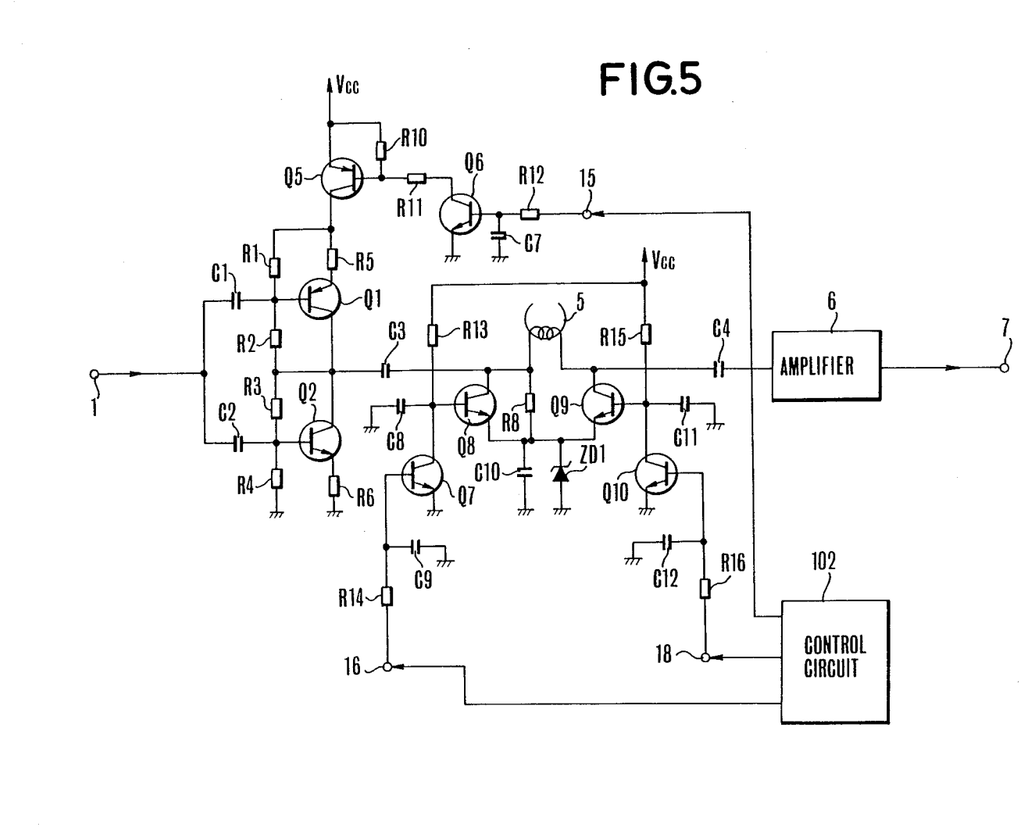
FIG. 5 is a circuit diagram showing a third embodiment of the present invention.

Next, explanations shall be made on another embodiment of the present invention by referring to FIG. 5. In this embodiment, transistors are used in place of the switches shown as 8, 4 in FIG. 1 to FIG. 4. FIG. 5 is a block diagram to show such an embodiment. In this drawing, elements having the same function as that in the embodiments shown in FIG. 1 to FIG. 4 are identified with the same numbers and marks and explanations thereof shall be omitted.

In this embodiment, one end of the magnetic head 5 which makes a recording or reproducing operation is connected to a collector of a transistor Q8 which is a switching element made conductive when a reproduction is made as will be explained later, and the other end of the head 5 is connected to a collector of a transistor Q9 which is a switching element made conductive when a recording is made as will be explained later. Emitters of the transistors Q8 and Q9 are connected together and their common connecting point is grounded through a parallel connection of a Zener diode ZD1, which is a constant voltage element, and a capacitor C10.

A base of the transistor Q8 is connected to a collector of a controlling transistor Q7 and a control signal, as hereinafter described, is fed to a base of this transistor Q7 through a resistor 14. Similarly, a base of the transistor Q9 is connected to a collector of a controlling transistor 10 and a control signal, as hereinafter described is fed to a base of this transistor Q10 through a resistor 16. The collector of the transistor Q7 is connected through a resistor R13 to a power source Vcc, while the collector of the transistor Q10 is connected through a resistor R15 to the power source Vcc.

A transistor Q5 and a transistor Q6 are provided to control the operation of the transistors Q1 and Q2 which constitute a recording amplifier. A control signal is fed from a terminal 15 through a resistor R12 to a base of the transistor Q6.

102 is a control circuit for feeding control signals to terminals 15, 16 and 18.

Figure 6:
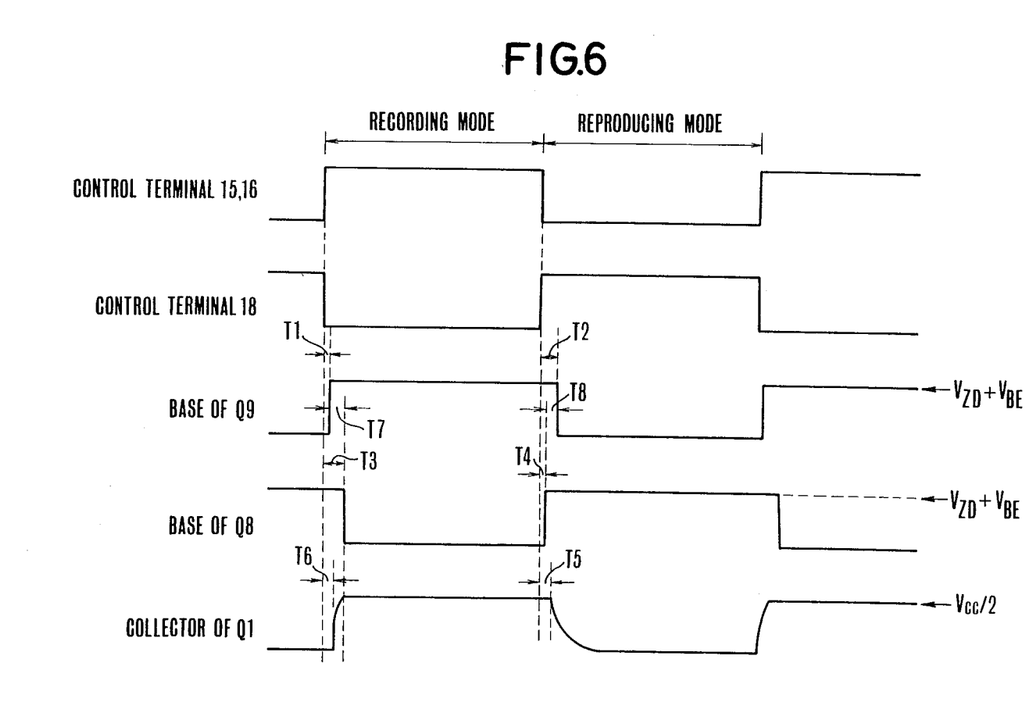
FIG. 6 is a time chart for the embodiment shown in FIG. 5.

Next, an operation of this embodiment having the above-mentioned arrangement shall be explained by referring to the time chart of FIG. 6.

First, at the time of recording mode the control terminals 15 and 16 in FIG. 5 come to have an "H" level and at the same time the control terminal 18 comes to have an "L" level thus turning the transistors Q6, Q5, Q7 on, the recording amplifier consisting of the transistors Q1, Q2 becomes operative to amplify the recording signal fed into the input terminal 1, and at the same time the transistor Q8 is placed in an OFF state, while the transistor Q9 is placed in ON state. Therefore, the collector of the transistor Q9 comes to have a potential of "$V_{ZD}+V_{SAT}$". Here $V_{SAT}$ is a collector-emitter saturation voltage and $V_{ZD}$ is a Zener voltage of a Zener diode ZD1.

Therefore, like in the case shown in FIG. 1, recording current flows via the capacitor C3 to the magnetic head 5 through the collector-emitter of the transistor Q9, and a recording signal will be recorded in the magnetic recording medium. At this time, since a reverse bias of "$V_{ZD}+V_{SAT}$" is impressed between the base-collector of the transistor Q8, if the Zener voltage $V_{ZD}$ of the Zener diode ZD1 is set at Vcc/2, the recording current will have no distortion as the relationship $V_{ZD} >> V_{SAT}$ exists.

On the other hand, at the time of reproduction mode, the control terminals 15 and 16 come to have an "L" level and the transistor Q5 is turned OFF, and the recording amplifier consisting of the transistors Q1 and Q2 is inoperative. Also, since the transistor Q7 is turned OFF the transistor Q8 is turned ON and the potential of the collector of the transistor Q8 comes to be "$V_{ZD}+V_{SAT}$". Further, at the time of reproduction mode, the control terminal 18 comes to have an "H" level thus the transistor Q10 is turned ON while the transistor Q9 is turned OFF, therefore the signal reproduced by the magnetic head 5 will be amplified in a same manner as in the above-mentioned embodiment by the reproduction amplifier 6 and will be fed to the output terminal 7.

Next, when the recording mode is changed over to the reproduction mode, as the transistor Q9 is turned OFF, the collector current of Vcc/R15 must be made to flow to the transistor Q10 for turning the transistor Q10 ON, and in this case the transistor Q10 is turned ON with an elapse of a time interval of T2 after the control terminal 18 changes from its "L" level to the "H" level because of the capacitor C12 and the resistor R16. On the other hand, the transistor Q7 is turned OFF with an elapse of a time interval of T4 after the control terminal 16 changes from "H" level to "L" level because of the capacitor C9 and the resistor R14. Here, when a relationship between the capacitors C9 and C12 is C9=C12 and the relationship between the resistors R14 and R16 is R14=R16, the relationship between the time intervals T2 and T4 will be T2>T4 as shown in FIG. 6. Also, the transistor Q5 is turned OFF with an elapse of a time interval T5 after the control terminal 16 is changed from its "H" level to the "L" level because of the resistor R12 and the capacitor C7. Further, now if the values of the capacitors C9, C7 and of the resistors R14 and R12 are chosen at appropriate levels, the relationship among the time intervals, T4, T5, T2 will be T4<T5<T2 as shown in FIG. 6.

When such circuits are provided as satisfying the above-mentioned conditions, first the transistor Q8 is turned ON, then the power source of the recording amplifier drops and the capacitor C3 starts discharging (here the transistor Q9 is turned ON under this state, and the head 5 is short-circuited), and the discharging current of the capacitor C3 will not flow to the magnetic head 5. Therefore the information recorded on the magnetic recording medium will not be damaged.

Next, when a reproduction mode is changed to a recording mode, the transistor Q9 is turned ON with an elapse of a time interval of T1 after the control terminal 18 is changed from its "H" level to the "L" level, while the transistor Q8 is turned OFF with an elapse of a time interval of T3 after the control terminal 16 changes from its "L" level to the "H" level. Also, the transistor Q5 is turned ON with an elapse of a time interval of T6 after the control terminal 6 is changed from its "L" level to the "H" level because of the resistor R12 and the capacitor C7, and the relationship among the time intervals T1, T6, T3 will be T1<T6<T3 as shown in FIG. 6 because of the same reason as in the case of the recording mode being changed to the reproduction mode. Therefore, first the transistor Q9 is turned ON (here since the transistor Q8 has been turned ON under this state, the head 5 will be short-circuited), then the transistors Q5, Q6 are turned ON and the transistor Q1 functions, then the voltage of its collector goes up and the capacitor C3 starts charging, then the charging is completed during the time interval T3 during which the transistor Q8 is in ON state, and thereafter the transistor Q8 is turned OFF.

That is, the ends of the magnetic head 5 are placed in a short-circuited state within a period of time when the capacitor C3 is being charged, and the discharging current will not flow to the magnetic head 5. Therefore, a "magnetization in a pulse shape" which is troublesome on the magnetic recording medium will not take place, and a recording can be made on a magnetic recording medium without damaging the signals which have been recorded.

Next, explanations, shall be made on the operations when a power source is energized. First the base potentials of the transistors Q8, Q9 go up along with the energization of the power source and the transistors Q8, Q9 are turned ON, then the emitter of the transistor Q8 (Q9) is raised to the Zener voltage $V_{ZD}$ while the ends of the magnetic head 5 are being short-circuited, therefore the charging current of the capacitors C3, C6 will not flow to the magnetic head 5. The reason therefor is that capacitors C8, C11, which function to block noises coming in from the bases of the transistors Q8 and Q9 when these transistors are turned ON, are connected to each one of these bases, and a time constant, R13×C8 (which is equivalent to R15×C11) of this capacitor C8 and the resistor R13 is set sufficiently smaller than time constant of the resistor R14 and the capacitor C9, that is, R14×C9 (which is equivalent to R16×C12). Therefore, when a power source is energized, regardless of whether it is in a recording mode or a reproduction mode, transient current will not flow to the head 5 as the transistors Q8, Q9 are turned ON.

Also, as shown in FIG. 6, since the magnetic head 5 has a period of time during which it is short-circuited in the time intervals T7 and T8, the charging or discharging current will not flow from the capacitor C3 to the magnetic head 5. Therefore, the load impedance of a recording amplifier consisting of the transistors Q1 and Q2 as viewed from the capacitor C3 can be made small and at the same time the charging or discharging time of the capacitor C3 can be made short, therefore, the time intervals T1, T2, T3, T4 shown in FIG. 6 can be set at small values.

While the reverse bias, "$V_{ZD}+V_{SAT}$" is impressed between the base and collector of the transistor Q8 when the recording is made in the above-mentioned embodiments, the emitters of the transistors Q8, Q9 in an apparatus having a negative power source may be grounded and at the same time the base of the transistor Q8, when the recording is made, is provided with a negative value, that is, a reverse bias is set between the base and emitter, thus cutting off the transistor Q8 so that a distortion in the recording current can be eliminated.

Also in the embodiment shown in FIG. 6, the distortion in the recording current can be prevented by the simple arrangement consisting of the Zener diode ZD without requiring a negative power source.

Figure 7:
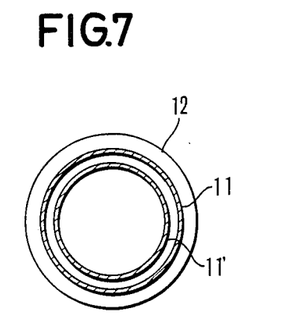
FIG. 7 is a plan to show a shape of a recording medium used in a recording or reproducing apparatus of the present invention.

Next, explanations shall be made on another embodiment. In this embodiment, video information of one field much can be recorded on a recording track 11 in a concentric form on a magnetic recording medium 12 of a shape shown in FIG. 7, and it can be used in a magnetic recording and reproducing apparatus having two magnetic heads provided in the direction of a radius of the concentric form. And this magnetic recording and reproducing apparatus is to first record on the recording track 11, and in continuation of a completion of this recording, a succeeding one field is recorded on a recording track 11′, then when a reproduction is made, the information from the recording track 11 and that from the track 11′ are reproduced alternately so that a framed still picture can be obtained.

Figure 8:
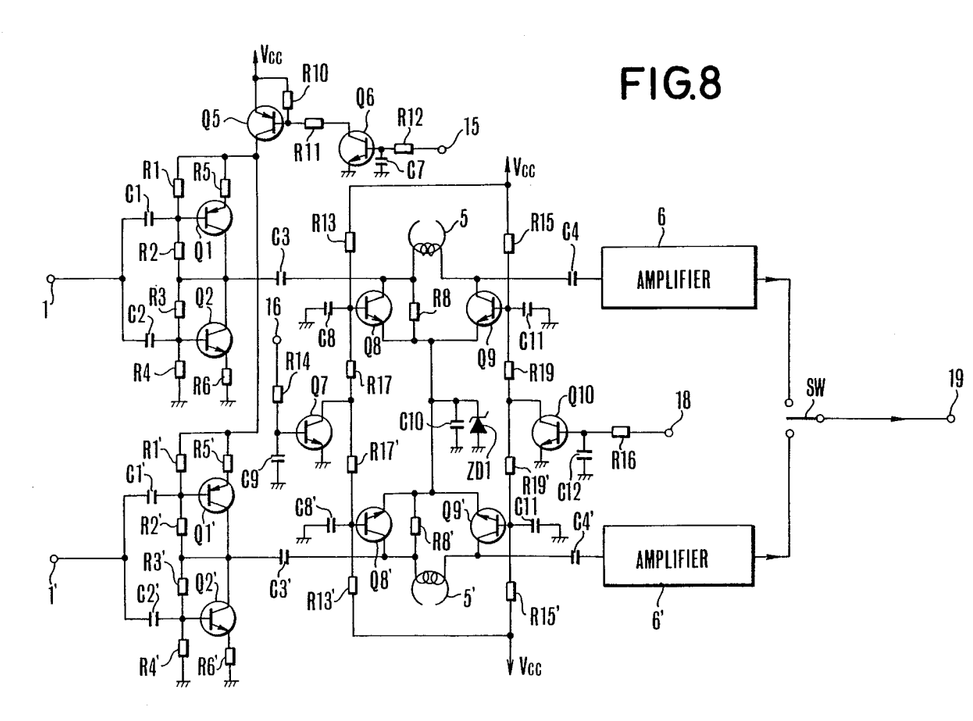
FIG. 8 is a circuit diagram showing an embodiment of a recording or reproducing apparatus in which video signals for one field can be recorded on or reproduced from each track of the recording medium shown in FIG. 7, respectively.

A circuit of an embodiment in which the present invention is applied to a magnetic recording and reproducing apparatus being capable of recording and reproducing of such framed. still picture is shown in FIG. 8. Here, the same components as in FIG. 5 are identified with the same numbers and marks and at the same time components having such function as corresponding to those in FIG. 5 are identified by the same numbers and marks with dashes, while detailed explanations thereof are omitted.

That is, in this embodiment, shown in FIG. 8, a magnetic head 5′ is further added to the embodiment shown in FIG. 6, and at the same time, transistors Q8′ and Q9′ for changing over this magnetic head 5′, and transistors Q1′ and Q2′ constituting a recording amplifier, as well as a reproducing amplifier 6′ are added, and further there are two input terminals 1, 1′ and at the same time the outputs of the reproduction amplifiers 6, 6′ are changed over by a switch SW and are introduced to the output terminal 19.

As it is further explained, as shown in FIG. 8, the transistors, Q5, Q7, Q10, the Zener diode ZD1, the resistors R10, R11, R12, R14, R16, as well as the capacitors, C7, C9, C10, C12 are so arranged as are used for change over of a recording and a reproduction in both of the magnetic heads, 5 and 5′. Further, resistors R17, R19 (R17′, R19′) are to prevent either one of the transistors Q8 and Q8′ (Q9 and Q9′) from being turned OFF in a mode in which a transistor is turned ON, because of a variation in a voltage in a normal direction between the base and emitter of these transistors, wherein the values of the resistors R17, R18 are so selected that $V_{cc} \times R17/(R13+R17)$ as well as $V_{cc} \times R19/(R15+R19)$ will be smaller than "$V_{ZD}+V_{BE}$".

An outline of the operation of such arrangement shall be explained. Only such field video information as desired to be recorded will be inputted into the input terminals 1, 1′, and when a reproduction is made, reproduced field video information in a continuous form which is obtained by changing over with the switch SW in a field cycle the field video information reproduced by the magnetic heads, 5, 5′ and amplified by the reproduction amplifiers, 6, 6′, will be outputted at the output terminal 9. Here, since the operations at the magnetic heads, 5, 5′ etc. are same as those in FIG. 5, their explanations shall be omitted.

As has been explained, when this embodiment is applied to a framed picture recording and reproducing apparatus, many components can be used for a changeover of the recording and reproduction of both of two magnetic heads, and the a size of the circuits can be made small.

As has been explained above, according to the above-mentioned embodiments, terminals of a magnetic head, when a change-over is made for a recording and reproduction by the magnetic head, are fixed at a predetermined level of potential, therefore, charging or discharging current will not flow from the capacitors connected to the magnetic head to this magnetic head, so that damage of the information recorded on the magnetic recording medium can be prevented. Also, since a prescribed level of potential is provided therein, a head change-over circuit can be made with a simple arrangement.

Further, when the present invention is applied to a still picture recording and reproducing apparatus, there will be an effect that the information which has been recorded will not be damaged at all even if a reproduction is made without shifting the track when, a recording is completed, and at the same time, the length of time required for the change-over ca be easily held down to a short period of time.

What is claimed is:

1. A recording and reproducing apparatus comprising:
    (a) a magnetic head;
    (b) a recording circuit for connection to said magnetic head for supplying a recording signal to said magnetic head;
    (c) a reproducing circuit for connection to said magnetic head for processing a signal detected from said magnetic head;
    (d) a capacitor connected between said magnetic head and said reproducing circuit upon such connection of said magnetic head to said reproducing circuit to remove a D.C. component of a recording signal supplied from said head to said reproducing circuit;
    (e) change over means for making a change over for said magnetic head between its connection to the recording circuit and a connection to the reproducing circuit; and
    (f) electric voltage applying means for applying a voltage corresponding to a voltage difference produced across both ends of said capacitor at the time of change over operation of said change over means to provide such connection of said magnetic head with said capacitor to said reproducing circuit.

2. A recording and reproducing apparatus according to claim 1, wherein said voltage applying means includes a capacitor for holding a voltage corresponding to a voltage difference produced across both ends of said capacitor at the time of changeover of said change over means.

3. A recording and reproducing apparatus according to claim 1, further comprising electric power supplying means for supplying electric power to said reproducing circuit.

4. A recording and reproducing apparatus according to claim 3, further comprising a switch for cutting off the connection between said magnetic head and said capacitor when electric power at a predetermined level is not supplied from said electric power supplying means to said reproducing circuit.

5. A recording and reproducing apparatus comprising:
   (a) a magnetic head;
   (b) a first circuit for connection to said magnetic head through a first change over point;
   (c) a second circuit for connection to said magnetic head through a second change over point;
   (d) a capacitor connected between said magnetic head and said first circuit upon such connection of said magnetic head to said first circuit to remove a D.C. component of a signal supplied from said first circuit to said magnetic head;
   (e) change over means for effecting change over between a connection of said magnetic head to the first circuit and a connection of said magnetic head to the second circuit; and
   (f) electric voltage applying means for applying a voltage corresponding to a voltage difference produced across both ends of said capacitor at the time of changeover operation of said change over means to the connection of said magnetic head with said capacitor to said first circuit.

6. A recording and reproducing apparatus according to claim 5, wherein said first circuit includes:
   (a) a transistor or transistors for amplifying a recording signal and supplying such amplified signal to said magnetic head; and
   (b) means for impressing a biasing voltage on said transistor or transistors.

7. A recording and reproducing apparatus according to claim 5, wherein said second circuit is to process a signal detected from said head.

8. A recording and reproducing apparatus according to claim 5, further comprising electric power supplying means for supplying electric power to said first circuit.

9. A recording and reproducing apparatus according to claim 8, further comprising a switch for cutting off the connection between said magnetic head and said capacitor when electric power at a predetermined level is not supplied from said electric power supplying means to said first circuit.

10. A recording and reproducing apparatus according to claim 9, wherein said switch further connects said head to said first circuit after the electric power supplied by said electric power supplying means attains an effective level of supply.

11. An apparatus comprising:
    (a) a head;
    (b) a first circuit connected to one end of said head;
    (c) a second circuit connected to the other end of said head;
    (d) a first switching element provided between said one end of the head and a first predetermined potential;
    (e) a second switching element provided between said other end of the head and a second predetermined potential;
    (f) a control signal generating circuit for generating a first control signal for varying the open or closed state of said first switching element and a second control signal for varying the open or closed state of said second switching element;
    (g) a first delay circuit for delaying the first control signal generated by said control signal generating circuit; and
    (h) a second delay circuit for delaying the second control signal generated by said control signal generating circuit.

12. An apparatus according to claim 11, wherein said first predetermined potential and said second predetermined potential have the same value.

13. An apparatus according to claim 11, wherein said first circuit is to impress a recording signal on said head.

14. An apparatus according to claim 11, wherein said second circuit is a processing circuit for processing the output of said head.

15. An apparatus according to claim 12, further comprising a constant voltage element for producing the first and second predetermined potentials.

16. An apparatus according to claim 11, wherein a delay time of the first control signal in said first delay circuit is so determined that it is shorter at the time when said first switching element is changed from its open state to its closed state than at the time when said first switching element is changed from its closed state to its open state.

17. An apparatus according to claim 11, wherein a delay time of the second control signal by said second delay circuit is so determined that it is shorter at the time when said second switching element is changed from its open state to its closed state than at the time when said second switching element is changed from its closed state to its open state.

* * * * *